United States Patent [19]
Mason et al.

[11] Patent Number: 5,508,344
[45] Date of Patent: Apr. 16, 1996

[54] LOW TEMPERATURE DRYING OF IMPACT MODIFIED POLYCARBONATE/POLYESTER COMPOSITIONS

[75] Inventors: James P. Mason, McKees Rocks; William B. Villee, Midway; Sivaram Krishnan, Pittsburgh, all of Pa.

[73] Assignee: Bayer Corporation, Pittsburgh, Pa.

[21] Appl. No.: 343,797

[22] Filed: Nov. 22, 1994

[51] Int. Cl.$^6$ .......................... C08L 69/00; C08L 67/02; C08K 5/54; C08K 5/15

[52] U.S. Cl. .................. 525/65; 525/67; 525/438; 525/439; 525/463; 524/109; 524/114; 524/265; 524/266

[58] Field of Search ................... 524/109, 114, 524/265, 266; 525/65, 67, 438, 439, 463

[56] References Cited

U.S. PATENT DOCUMENTS

| | | | |
|---|---|---|---|
| 3,864,428 | 2/1975 | Nakamura | 525/67 |
| 4,677,148 | 6/1987 | Chung et al. | 524/296 |
| 5,405,892 | 4/1995 | Krishnan | 524/114 |

FOREIGN PATENT DOCUMENTS

| | | | |
|---|---|---|---|
| 505869 | 9/1992 | European Pat. Off. | |
| 148560 | 7/1987 | Japan | 525/463 |
| 179558 | 8/1987 | Japan | 525/438 |

*Primary Examiner*—David Buttner
*Attorney, Agent, or Firm*—Joseph C. Gil; Aron Preis

[57] ABSTRACT

A thermoplastic molding composition comprising a resinous blend of polycarbonate, polyester and an impact modifier and an additive amount of a siloxane compound containing a pendant oxirane group is disclosed. It was surprisingly and unexpectedly discovered that unlike the corresponding compositions which contain no siloxane compound, the inventive composition is capable of being dried at low temperatures prior to molding and still maintain high impact strength.

12 Claims, No Drawings

LOW TEMPERATURE DRYING OF IMPACT MODIFIED POLYCARBONATE/POLYESTER COMPOSITIONS

FIELD OF THE INVENTION

The invention is directed to thermoplastic molding compositions and more particularly to the processing of compositions containing impact modified blends of polycarbonate and polyester resins.

SUMMARY OF THE INVENTION

A thermoplastic molding composition comprising (i) about 1.0 to 99.0 percent of a polycarbonate resin (ii) about 1.0 to 99.0 percent of a thermoplastic polyester (iii) about 1.0 to 25.0 percent of an impact modifier and an additive amount of a siloxane compound containing a pendant oxirane group is disclosed. It was surprisingly and unexpectedly discovered that the composition of the invention is capable of being dried at low temperatures prior to molding and still maintain high impact strength. Unlike the low temperature-dried corresponding composition which contains no siloxane, the composition of the invention retains a high level of resistance to impact.

BACKGROUND OF THE INVENTION

Thermoplastic compositions containing impact modified blends of polycarbonate and polyester are known (see, for instance, U.S. Pat. No. 4,677,148) and many representative products have long been available in commerce. Such compositions feature an attractive profile of physical and mechanical properties and are found in wide use in a host of applications. The processing of these compositions require a drying step, normally at about 120° C., prior to molding. The drying step is critical to the production operation and dryer failure results in the molding of unacceptable parts. It is also well recognized that lowering of the drying temperature of such compositions is desirable because it lowers the degree of oxidative degradation and because it reduces the sticking and clumping which characterized these compositions upon drying at temperatures above about 200° F. Naturally, there are also economic reasons for drying at low temperatures.

The siloxane of the present invention is known in the art and has previously been disclosed in connection with a pigmented polycarbonate composition. A melt-stable, pigmented polycarbonate composition containing the siloxane of the present invention has been disclosed in patent application Ser. No. 08/263,702, filed Jun. 22, 1994, and assigned to Miles Inc. of Pittsburgh, Pa., now U.S. Pat. No. 5,405,892.

DETAILED DESCRIPTION OF THE INVENTION

The thermoplastic molding composition of the present invention comprises (i) about 1.0 to 99.0, preferably 30.0 to 85.0 percent of a polycarbonate resin (ii) about 1.0 to 99.0, preferably 10.0 to 60.0 percent of a thermoplastic polyester, (iii) about 1.0 to 25.0, preferably 3.0 to 15.0 percent of an impact modifier, and an additive amount, preferably about 0.01 to 5, most preferably 0.05 to 2.0 pads per one hundred weight of resinous components (phr) of a siloxane compound containing a pendant oxirane group. The weight of the resinous components in the present context is the total weight of (i), (ii) and (iii).

(i) Polycarbonate

Aromatic (co)polycarbonates within the scope of the present invention generally have a weight average molecular weight of 10,000– 200,000, preferably 20,000–80,000 and their melt flow rate, per ASTM D-1238 at 300° C., is about 1 to about 65 gm/10 min., preferably about 2–15 gm/10 min. These may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the inventor conform to the structural formulae (1) or (2).

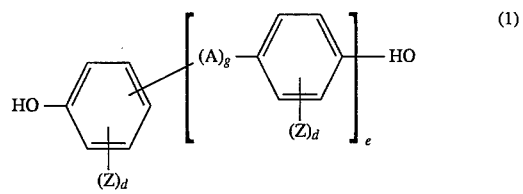

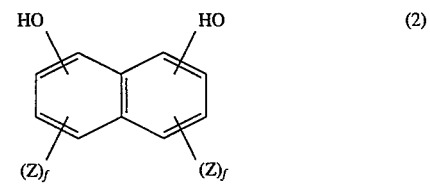

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or $SO_2$ or a radical conforming to

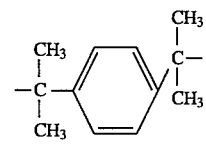

e and g both denote 0 or 1; Z is F, Cl, Br or a $C_{1-4}$ alkyl and if several Z radicals are substituents in one aryl radical they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, α,α-bis-(hydroxyphenyl)-diisopropylbenzenes, and 2,2,4 trimethylcyclohexyl 1,1-diphenol as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane; 2,2,4 trimethylcyclohexyl-1,1-diphenol; α,α'-bis-(3,5-dimethyl-4-hydroxy-phenyl)-p-diisopropylbenzene and 4,4'-sulfonyl diphenol.

Examples of particularly preferred aromatic bisphenols are 2,2,-bis-( 4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonates, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of: polyhydroxyl compounds. Polycarbonates of this type have been described, for example, in German Offenlegungsschriften 1,570,533; 2,116,974 and 2,113,374; British Patents 885,442 and 1,079, 821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-( 2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5– 24, 13–16, 7.5–13.0 and 3.5–6.5 gm/10 min., respectively. These are products of Miles Inc. of Pittsburgh, Pa.

Polycarbonate resins suitable in the practice of the invention are known and their structures and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

(ii) (co)polyester

The (co)polyester suitable in the present invention comprises repeat units from at least one $C_{6-20}$-aromatic, $C_{3-20}$-aliphatic or alicyclic dicarboxylic acid, and repeat units from at least one $C_{2-20}$-aliphatic glycol.

Examples of the dicarboxylic acids include malonic, succinic, glutaric, adipic, pimelic, suberic, azelaic, sebacic, dodecanedioic, 1,4-, 1,5- and 2,6-decahydronaphthalene dicarboxylic acid, and cis- or trans- 1,4 cyclohexane dicarboxylic acid. Examples of useful aromatic dicarboxylic acid are terephthalic acid; isophthalic acid; 4,4'-biphenyldicarboxylic acid; trans 3,3'- and trans 4,4'-stilbenedicarboxylic acid, 4,4'-dibenyldicarboxylic acid; 1,4-, 1,5'-, 2,3'-, 2,6-, and 2,7-naphthalene-dicarboxylic acid. The preferred dicarboxylic acids are terephthalic and isophthalic acid or mixtures thereof.

The preferred glycol of the (co)polyester includes 2 to 8 carbon atoms. Examples include ethylene glycol, 1,2-propylene glycol, 1,3-propanediol, 1,4-butanediol, 1,5-pentanediol, 1,6-hexanediol, 1,2-, 1,3- and 1,4-cyclohexanedimethanol, neopentyl glycol, and 2,2,4,4-tetramethyl-1,3-cyclobutanediol. The preferred diols are 1,4-cyclohexanedimethanol, ethylene glycol and mixtures thereof.

The preferred (co)polyesters include resins having repeat units from poly(ethylene terephthalate) or poly(1,4-cyclohexylenedimethylene terephthalate). Preferred (co)polyesters comprise repeat units from terephthalic acid, isophthalic acid or mixtures thereof and 1,4-cyclohexanedimethanol. Other preferred (co)polyesters comprise repeat units from terephthalic acid and 1,4-cyclohexanedimethanol, ethylene glycol or mixtures thereof.

The preparation of the (co)polyesters follow conventional procedures well known in the art such as the process described in U.S. Pat. No. 2,901,466, which disclosure is incorporated herein by reference.

The (co)polyesters of the invention have as a rule inherent viscosity of about 0.4 to 1.0 dl/g, preferably about 0.6 to 0.8 dl/g at 25° C. in a solvent containing 60 w/% phenol and 40 w/% tetrachloroethane.

(iii) impact modifier

The impact modifier in the context of the invention is well recognized in the thermoplastic art. Suitable impact modifiers have been disclosed in the following documents, the relevant disclosures of which are incorporated herein by reference: U.S. Pat. Nos. 5,276,077, 5,124,402, 5,075,375 and 5,219,933. Among the suitable impact modifiers, special mention may be made of rubber modified monovinylidene aromatic copolymers, including ABS resins, and core/shell graft copolymers. Briefly, the suitable ABS (acrylonitrile - butadiene - styrene) resin has a buta-diene content of about 20–80%, preferably 40–80%, the balance being of a grafted styrene and acrylonitrile.

In general, the moieties of ABS graft polymers consist of two or more polymeric parts of different compositions chemically united. The graft polymers may be prepared by polymerizing at least one conjugated diene, such as butadiene or a conjugated diene with a monomer polymerizable therewith, such as styrene, to provide a backbone, with subsequent polymerization of at least one grafting monomer, and preferably two, in the presence of the prepolymerized backbone to complete the graft polymer.

The backbone, as mentioned, is preferably a conjugated diene polymer or copolymer such as polybutadiene, butadiene-styrene, butadiene-acrylonitrile or the like.

Examples of dienes that may be used are butadiene; isoprene; 1,2-heptadiene; methyl-1,3-pentadiene; 2,3-dimethyl-1,3-butadiene; 1,3-pentadiene; 2-methyl-3-ethyl-1,3-butadiene; 2-ethyl-1,3-pentadiene; 1,3- and 2,4-hexadienes, chloro- and bromo-substituted butadienes such as dichlorobutadiene, bromobutadiene, chloroprene, dibromobutadiene, mixtures thereof and the like. The preferred conjugated diene is butadiene.

The first monomer or group of monomers polymerized in the presence of the prepolymerized backbone are preferably monovinyl aromatic hydrocarbons. Examples of the monovinyl aromatic compounds and substituted monovinyl aromatic compounds that may be used are styrene and other vinyl-substituted aromatic compounds including alkyl-, cyclo-, aryl-, alkaryl-, alkoxy-, aralkyl-, aryloxy-, and other substituted vinyl aromatic compounds. Examples of such compounds are 3-methylstyrene; 3,5-diethylstyrene and 4-n-propylstyrene, α-methylstyrene, α-methylvinyltoluene, α-chlorostyrene, vinyltoluene, α-bromostyrene, chlorophenyl ethylenes, dibromophenyl ethylenes, tetrachlorophenyl ethylenes, 1-vinylnaphthalene, 2-vinylnaphthalene, mixtures thereof and the like. The preferred monovinyl aromatic hydrocarbon used herein is styrene and/or α-methylstyrene.

The second group of monomers that are polymerized in the presence of the prepolymerized backbone are acrylonitrile, substituted acrylonitrile and/or acrylic acid esters. Examples include acrylonitrile, substituted acrylonitrile, or acrylic acid esters of the above formula are acrylonitrile, ethacrylonitrile, methacrylonitrile, α-chloroacrylonitrile, β-chloroacrylonitrile, α-bromoacrylonitrile and β-bromoacrylonitrile, methacrylate, methylmethacrylate, ethylacrylate, butylacrylate, propylacrylate, isopropylacrylate, isobutylacrylate, mixtures thereof and the like. The preferred acrylic monomer used herein is acrylonitrile and the preferred acrylic acid esters are ethylacrylate and methylmethacrylate.

In the preparation of the graft polymer, the conjugated diolefin polymer or copolymer exemplified by 1,3-butadiene polymer or copolymer and the monomers polymerized in the presence of the backbone are exemplified by styrene and acrylonitrile.

The preparation of suitable ABS resins is described in U.S. Pat. No. 3,852,393, the disclosure of which is incorporated herein by reference.

Suitable, ABS graft resins are known in the art and are readily available in commerce.

Among the acrylate graft polymers suitable in the practice of the invention are the acrylic rubber interpolymer composites which are described in U.S. Pat. Nos. 3,808,180 and 4,096,202, both incorporated by reference herein. Briefly, the technology described therein is that of the preparation of a specific class of multiphase compounds. These are compositions comprising about 25 to 95% by weight of a first elastomeric phase and about 75 to 5% by weight of a second, rigid, thermoplastic phase. The first phase is polymerized from about 75 to 99.8% by weight $C_1$ to $C_6$ acrylate resulting in an acrylic rubber core having a glass transition temperature below about 10° C. which is cross-linked with 0.1 to 5% by weight of a cross-linking monomer and to which is added 0.1 to 5% by weight of a graft-linking monomer.

The preferred alkyl acrylate is butyl acrylate. The cross-linking monomer is an ethylenically unsaturated monomer having a plurality of additional polymerizable reactive groups all of which polymerize at substantially the same rate of reaction. Suitable cross-linking monomers include acrylic and methacrylic esters of polyols such as butanediol diacrylate and dimethacrylate, trimethylol propane trimethacrylate and the like; di- and trivinyl benzene, vinyl acrylate and methacrylate, and the like. The preferred cross-linking monomer is butanediol diacrylate. The graft-linking monomer is an ethylenically unsaturated monomer having a plurality of additional polymerizable reactive groups, at least one of which polymerizes at a substantially different rate of polymerization from at least one other of said reactive groups. The function of the graft-linking monomer is to provide a residual level of unsaturation in the elastomeric phase, particularly in the latter stages of polymerization and, consequently, at or near the surface of the elastomer particles. The preferred graft-linking monomers are allyl methacrylate and diallyl maleate. The final stage monomer can be comprised of $C_{1-16}$ alkyl methacrylate, styrene, acrylonitrile, alkyl acrylates, allyl methacrylate, diallyl methacrylate, and the like, as long as the Tg is at least about 20° C. Preferably, the final stage monomer system is at least 50 weight % $C_{1-4}$ alkyl methacrylate. It is further preferred that the final stage polymer be free of units which tend to degrade polycarbonates. In a preferred embodiment of the present invention, the acrylate graft polymer is an acrylic rubber inter-polymer composite which is available commercially from the Rohm & Haas Corporation, Philadelphia, Pa. under the trade name Paraloid EXL-2330. That modifier is characterized in that its acrylic rubber core comprises n-butyl acrylate and in that its crosslinking agent is 1,3-butanediol diacrylate, and in that its graft-linking agent is diallyl maleate and in that the second phase monomer is methyl methacrylate.

Additional suitable acrylate graft copolymers are those described in U.S. Pat. No. 4,022,748, incorporated by reference herein. A yet additional preferred embodiment is represented by a core/shell graft polymer which is based on a siloxane and poly n-butylacrylate core with a poly n-butylacrylate-methylmethacrylate shell. This graft is produced by (i) emulsion polymerization of cyclosiloxanes with multifunctional crosslinking agents to produce a polydimethylsiloxane rubber (PDMS) which is (ii) incorporated into a poly n-butylacrylate matrix forming an interpenetrating network (IPN), which is the core of the core shell modifier, and (iii) methyl methacrylate is then grafted on the IPN thus forming the shell. A more complete description of this embodiment is included in U.S. Pat. No. 4,888,388, the specification of which is incorporated herein by reference.

The siloxane compound of the invention conforms structurally to

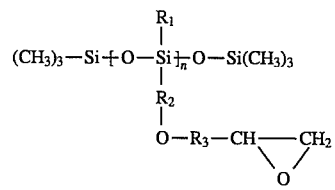

where $R_1$ is $C_{1-4}$ alkyl or $C_{6-14}$ aryl, $R_2$ denotes $(CH_2)_m$ where m is an integer of 1 to 4, $R_3$ is $(CH_2)_p$ where p is 1 to 4 and n is about 1 to 10,000, preferably 2 to 30, more preferably 3 to 25.

In the most preferred embodiment of the invention the stabilizer is one where $R_1$ is methyl, $R_2$ denotes $(CH_2)_3$, $R_3$ is $CH_2$ and n is about 7– 11.

The composition of the invention may additionally contain flame retarding agents, reinforcing agents, fillers and pigments and the like of which are known in the art for their utility in polycarbonate/polyester blends.

An additional embodiment of the invention is related to the preparation of molded articles. Accordingly, the preparation process comprises (A) compounding by extrusion a resinous blend containing (i) about 1.0 to 99.0 percent of a polycarbonate resin, (ii) about 1.0 to 99.0 percent of a thermoplastic polyester resin, and (iii) about 1.0 to 25.0 percent of an impact modifier, and about 0.01 to 5.0 phr of a siloxane compound conforming to

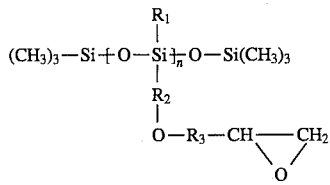

where $R_1$ is $C_{1-4}$ alkyl or $C_{6-14}$ aryl, $R_2$ denotes $(CH_2)_m$ where m is an integer of 1 to 4, $R_3$ is $(CH_2)_p$ where p is 1 to 4 and n is about 1 to 10,000, preferably 2 to 30, more preferably 3 to 25, to produce pellets, (B) drying said pellets at a temperature not exceeding 200° F. for a time not exceeding 6 hours, and (C) molding the pellets to produce the article.

Articles thus molded feature greater resistance to impact stress than do corresponding articles which are identical in all respects of their composition and processing except for the absence of the siloxane compound therefrom.

The invention is further illustrated but is not intended to be limited by the following examples in which all parts and percentages are by weight unless otherwise specified.

EXAMPLES

Experimental

Compositions in accordance with the invention were prepared and their properties determined. In the preparation of the compositions which are described below, the polycarbonate resin used was Makrolon 2800 resin, a homopolycarbonate based on bisphenol-A, MFR of about 9.0 g/10 min. (ASTM D-1238) a commercial product of Miles. The thermoplastic polyester was Tenite 12270 polyethylene terephthalate having an intrinsic viscosity of about 0.7, a commercial product of Eastman Chemical Company, The impact modifier used in these compositions was an ABS characterized in that it contains 75.0% polybutadiene and 25% of SAN (weight ratio of styrene to acrylonitrile 72/28). The siloxane stabilizer used in the compositions conforms to

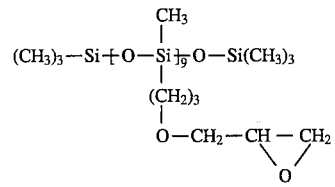

The components were first compounded conventionally using a twin screw extruder (ZSK30) using typical processing conditions. Compounds thus prepared were subjected to one of the following drying conditions: (i) 6 hours at 250° F. (121° C.); (ii) 6 hours at 180° F. (82° C.) and (iii) no drying. Test bars were then prepared by injection molding (3 oz. Newbury) from each of these samples and the properties measured in accordance with ASTM procedures. The table below contains a summary of the results.

| Components | Examples 1 | 2 | 3 |
|---|---|---|---|
| Polycarbonate, w/% | 57.0 | 57.0 | 57.0 |
| Polyester, w/% | 37.0 | 37.0 | 37.0 |
| Impact modifier, w/% | 6.0 | 6.0 | 6.0 |
| Siloxane, phr | 0.0 | 0.1 | 0.2 |
| Drying condition (i) | | | |
| Impact strength, Notched Izod, ft.lb/in | | | |
| 0.125" @ 73° F. | 18.9 | 18.3 | 18.6 |
| 0.250" @ 73° F. | 4.4 | 4.1 | 5.8 |
| Flexural strength, kpsi | 12.1 | 12.1 | 12.1 |
| Flexural modulus, kpsi | 327.3 | 328.4 | 325.6 |
| Tensile strength @, yield, kps | 8.1 | 8.3 | 8.2 |
| Elongation @ yield, % | 5.2 | 5.2 | 5.1 |
| Tensile strength @ break, kpsi | 8.2 | 8.2 | 8.6 |
| Elongation @ break, % | 138 | 127 | 144 |
| Drying condition (ii) | | | |
| Impact strength, Notched Izod, ft.lb/in | | | |
| 0.125" 73° F. | 5.2 | 18.4 | 17.9 |
| 0.250" 73° F. | 2.6 | 4.4 | 4.0 |
| Flexural strength, kpsi | 12.2 | 12.1 | 12.0 |
| Flexural modulus, kpsi | 329.5 | 324.4 | 325.5 |
| Tensile strength @ yield, kps | 8.4 | 8.3 | 8.6 |
| Elongation @ yield, % | 4.7 | 5.1 | 5.0 |
| Tensile strength @ break, kpsi | 6.7 | 8.6 | 8.2 |
| Elongation @ break, % | 107 | 138 | 146 |
| Drying condition (iii) | | | |
| Impact strength, Notched Izod, ft.lb/in | | | |
| 0.125" @ 73° F. | 0.6 | 1.6 | 2.8 |

Analysis of the data shows that at high drying temperature there is no advantage to the addition of siloxane to the composition. The beneficial effect of incorporating the siloxane is only realized upon low temperature drying.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising (i) about 1.0 to 99.0 percent of a polycarbonate resin, (ii) about 1.0 to 99.0 percent of a thermoplastic polyester resin, and (iii) about 1.0 to 25.0 percent of an impact modifier, said percent, all occurrences relating to the weight of said composition, and about 0.01 to 5.0 phr of a siloxane compound conforming to

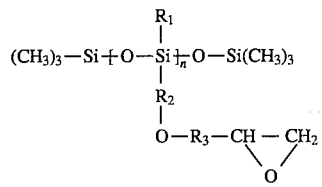

where $R_1$ is $C_{1-4}$ alkyl or $C_{6-14}$ aryl, $R_2$ denotes $(CH_2)_m$ where m is an integer of 1 to 4, $R_3$ is $(CH_2)_p$ where p is 1 to 4 and n is about 1 to 10,000.

2. The composition of claim 1 wherein n is 2 to 30.

3. The composition of claim 1 wherein $R_1$ is methyl, $R_2$ denotes $(CH_2)_3$, $R_3$ is $CH_2$ and n is about 7 to 11.

4. The composition of claim 1 further containing at least one member selected from the group consisting of flame retarding agent, reinforcing agent, filler and pigment.

5. A process for the preparation of a molded article composing (A) compounding by extrusion a resinous blend containing (i) about 1.0 to 99.0 percent of a polycarbonate resin, (ii) about 1.0 to 99.0 percent of a thermoplastic polyester resin, and (iii) about 1.0 to 25.0 percent of an impact modifier, and about 0.01 to 5.0 phr of a siloxane compound conforming to

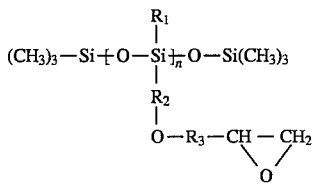

where $R_1$ is $C_{1-4}$ alkyl or $C_{6-14}$ aryl, $R_2$ denotes $(CH_2)_m$ where m is an integer of 1 to 4, $R_3$ is $(CH_2)_p$ where p is 1 to 4 and n is about 1 to 10,000 to produce pellets, (B) drying said pellets at a temperature not exceeding 200° F. for a time not exceeding 6 hours, and (C) molding the pellets to produce said article.

6. The process of claim 5 wherein said n is 2 to 30.

7. The process of claim 5 wherein said $R_1$ is methyl, $R_2$ denotes $(CH_2)_3$, $R_3$ is $CH_2$ and n is about 7 to 11.

8. A molded article prepared by the process of claim 5.

9. A molded article prepared by the process of claim 6.

10. A molded article prepared by the process of claim 7.

11. The process of claim 5 wherein said blend further contains at least one member selected from the group consisting of flame retarding agent, reinforcing agent, filler and pigment.

12. A molded article prepared by the process of claim 11.

* * * * *